(12) United States Patent
Poret et al.

(10) Patent No.: US 11,923,731 B2
(45) Date of Patent: Mar. 5, 2024

(54) ELECTRICAL FILTERING SYSTEM FOR A SMART ELECTRIC MOTOR WITH DECOUPLED MULTIPLE WINDINGS AND ASSOCIATED SMART ELECTRIC MOTOR

(71) Applicant: SAFRAN ELECTRICAL & POWER, Blagnac (FR)

(72) Inventors: Philippe Poret, Blagnac (FR); Laurent Cartailler, Blagnac (FR); Julie Danchin, Blagnac (FR); Jérémy Cuenot, Blagnac (FR); Olivier Berry, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 456 days.

(21) Appl. No.: 17/311,104

(22) PCT Filed: Dec. 2, 2019

(86) PCT No.: PCT/FR2019/052896
§ 371 (c)(1),
(2) Date: Jun. 4, 2021

(87) PCT Pub. No.: WO2020/115418
PCT Pub. Date: Jun. 11, 2020

(65) Prior Publication Data
US 2022/0045580 A1 Feb. 10, 2022

(30) Foreign Application Priority Data

Dec. 5, 2018 (FR) ........................................ 1872385

(51) Int. Cl.
*H02K 11/33* (2016.01)
*B64D 27/24* (2006.01)

(52) U.S. Cl.
CPC ............. *H02K 11/33* (2016.01); *B64D 27/24* (2013.01); *H02K 2211/03* (2013.01)

(58) Field of Classification Search
CPC ..... H02K 11/33; H02K 2211/03; B64D 27/24
See application file for complete search history.

(56) References Cited

U.S. PATENT DOCUMENTS

| 8,957,557 B2 | 2/2015 | Yamasaki et al. |
| 9,812,934 B2 | 11/2017 | Mukunoki |
| 2012/0098391 A1 | 4/2012 | Yamasaki et al. |

FOREIGN PATENT DOCUMENTS

| EP | 3 312 983 A1 | 4/2018 | |
| EP | 3312983 A1 * | 4/2018 | ............ H02M 7/003 |

(Continued)

OTHER PUBLICATIONS

FR-3044841-A1_translate (Year: 2017).*

(Continued)

*Primary Examiner* — Tulsidas C Patel
*Assistant Examiner* — Mohammed Ahmed Qureshi
(74) *Attorney, Agent, or Firm* — Oblon, McClelland, Maier & Neustadt, L.L.P.

(57) ABSTRACT

An electrical filtering system including capacitors and an electrical distribution device including a stack of two electrically conducting layers facing one another and separated by an insulating layer, the stack being mounted on a rigid insulating plate, and said capacitors being mounted on said distribution device, the rigid plate extending in a plane orthogonal to the direction in which the layers are stacked. The distribution device includes a plurality of electrical connections distributed angularly over the outer perimeter of the distribution device and protruding in a plane parallel to the plane in which the rigid plate extends, and extending from the outer perimeter of the distribution device, each of the connections being, on the one hand, connected to at least (Continued)

one capacitor and, on the other hand, intended to be connected to an arm of an electrical inverter mounted on a tubular electrical converter of an electronic control unit.

5 Claims, 5 Drawing Sheets

(56) References Cited

FOREIGN PATENT DOCUMENTS

FR  3 044 841 A1    6/2017
FR   3044841 A1 *  6/2017

OTHER PUBLICATIONS

EP-3312983-A1_translate (Year: 2018).*
International Search Report dated Apr. 30, 2020 in PCT/FR2019/052896 filed on Dec. 2, 2019, citing documents AA-AC, AO and AP therein, 2 pages.
French Preliminary Search Report (with English translation of Categories of Cited Documents) dated Aug. 20, 2019 in French Application 1872385 filed on Dec. 5, 2018, citing documents AA-AC, AO and AP therein, 3 pages.

* cited by examiner

ELECTRICAL FILTERING SYSTEM FOR A SMART ELECTRIC MOTOR WITH DECOUPLED MULTIPLE WINDINGS AND ASSOCIATED SMART ELECTRIC MOTOR

BACKGROUND OF THE INVENTION

The invention relates to a smart electric motor, particularly for an aircraft, and more particularly to the architecture of an electric motor with multiple decoupled windings with strong mechanical integration.

Vertical takeoff and landing aircraft are used more and more, particularly in intra-urban and inter-urban transportation of merchandise or of persons.

The revolution in aerial transport has given birth to a growing need for the propulsion of the new aircraft, VTOL ("Vertical Take-Off and Landing") for example. Electrical energy is the main vector of this revolution, due to its flexibility of implementation, its efficiency (only the necessary energy is produced), its reliability (limited maintenance) and mainly by the potential reduction in mass and volume which it generates relative to a conventional propulsion system (thermal with hydraulic or pneumatic energy distribution). On the other hand, the current power of on-board electric motors does not allow competition with the power developed by a single heat engine; it is therefore necessary to multiply the number of electric motors.

It is therefore easy to understand that the mechatronic integration constraints (mass and volume) of the electric motor, controller (power electronics and control electronics), filtering and cooling system assembly is a key problem of this change, particularly for preserving a propulsion assembly of which the mass and the bulk remain small.

The electrical machine of a smart motor is controlled by an electronic control unit including in particular a power electrical converter such as an inverter. During the design of a control inverter of a smart motor, the following points must be taken into account:

power transistors, of the MOS or IGBT type for example, of the arms of the inverter must be installed so as to dissipate commutation and conduction losses in a radiator in order to ensure their durability from the thermal standpoint;

parasitic inductance between the arms of the inverter and the decoupling capacitors provided for filtering must be minimized in order to limit overvoltage during blocking of the power transistors in order to ensure the durability of the power transistors from the electrical standpoint.

the decoupling capacitors of the filtering means must have a minimum value in order to ensure the stability of the DC voltage bus. Moreover, they must be configured to supply the effective current to the inverter. These two constraints imply considerable volume for the decoupling capacitors.

Generally, the high current levels used for this type of application involve the use of a bus bar or a power printed circuit, or PCB for electrically connecting the power transistors of the inverter arms and the capacitors of the filtering means. As a result, the power transistors are installed on the same surface of the radiator in order to limit assembly problems and to ensure resistance to mechanical stresses linked to vibrations and/or to shocks.

OBJECT AND SUMMARY OF THE INVENTION

The invention aims to supply an architectural filtering system solution allowing minimizing the volume occupied by the filtering system and optimizing its installation in the housing of a smart motor while limiting the parasitic inductance between the power transistors and the filtering decoupling capacitors and offering mechanical assembly durability with respect to shocks and vibrations and simplification of mechanical integration during assembly by avoiding isostatism.

In a first object of the invention an electrical filtering system is proposed comprising capacitors and an electrical distribution device comprising a stack of two electrically conducting layers facing one another and separated by an electrically insulating layer, the stack being mounted on a rigid electrically insulating plate and said capacitors being mounted on said electrical distribution device, the rigid plate extending in a plane orthogonal to the direction in which the conducting and insulating layers are stacked.

According to a general feature of the first object of the invention, the electrical distribution device comprises a plurality of electrical connections distributed angularly over the outer perimeter of the electrical distribution device and protruding in a plane parallel to the plane in which the rigid plate extends, and extending from the outer perimeter of the electrical distribution device, each of the connections being, on the one hand, connected to at least one capacitor of the filtering system and, on the other hand, intended to be connected to an arm of an electrical inverter mounted on a tubular electrical converter of an electronic control unit.

The shape of the electrical distribution device allows limiting the leakage inductance between the different arms of the inverter and the decoupling capacitors of the filtering system.

The filtering system according to the invention further allows communalizing the decoupling capacitors with respect to the different arms of the inverter of the electrical converter of the electronic control unit.

Preferably, each of the electrical connections comprises an end integral with the stack, a free end opposite to the integral end, and a flexible portion between the two ends.

The flexible portion provided between the two ends of each of the electrical connections allows offering a degree of mechanical freedom with respect to assembly and to mechanical stresses such as shocks and vibrations.

The flexible portion can have the shape of a wave in a plane orthogonal to the plane in which the rigid support extends. This wave shape, or non-linear shape, in said orthogonal plane, allows permitting a movement of the plate formed by the stack and the rigid support in a direction parallel to the plane in which the rigid support extends. This wave shape in said orthogonal plane also allows permitting a movement of the plate formed by the stack and the rigid support in a direction orthogonal to the plane in which the rigid support extends.

The filtering system preferably comprises a number of connections which is a multiple of three, in order to have one connection for each phase.

According to another aspect of the invention, a smart motor is proposed comprising an electronic control unit comprising an electrical converter in the form of a hollow cylinder and an electrical filtering system as defined above and electrically connected to the electrical converter of the electronic control According to another aspect of the invention, a propulsion system for an aircraft is proposed comprising at least one rotor and, for each rotor, at least one smart motor as defined above, mechanically connected to the rotor.

According to another aspect of the invention, an aircraft is proposed endowed with an aircraft propulsion system as defined above.

BRIEF DESCRIPTION OF THE DRAWINGS

The invention will be better understood upon reading the following, by way of indication but without limitation, with reference to the appended drawings in which.

DETAILED DESCRIPTION OF EMBODIMENTS

Figure 1:
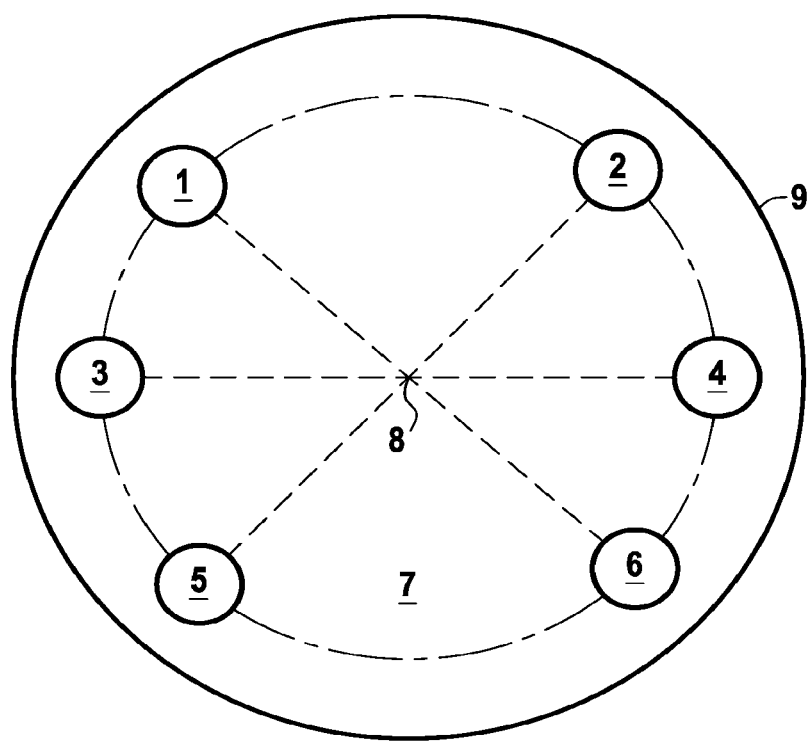
FIG. 1 shows schematically a multi-rotor aircraft equipped with a propulsion system according to one embodiment of the invention.

A multi-rotor aircraft 7 is shown schematically in FIG. 1, equipped with a propulsion system 9 according to one embodiment of the invention. In the example illustrated in FIG. 1, the propulsion system 9 comprises six rotors 1 to 6 distributed over the multi-rotor phantom line circle. The rotors 1 to 6 form three pairs of rotors, the rotors of the same pair being symmetrically opposed with respect to a center of symmetry 8. The first pair of rotors comprises rotors 1 and 6, the second pair of rotors comprises rotors 2 and 5, the third pair of rotors comprises rotors 3 and 4. In addition, the propulsion system 9 comprises one smart motor 10 for each rotor 1 to 6.

Figure 2:
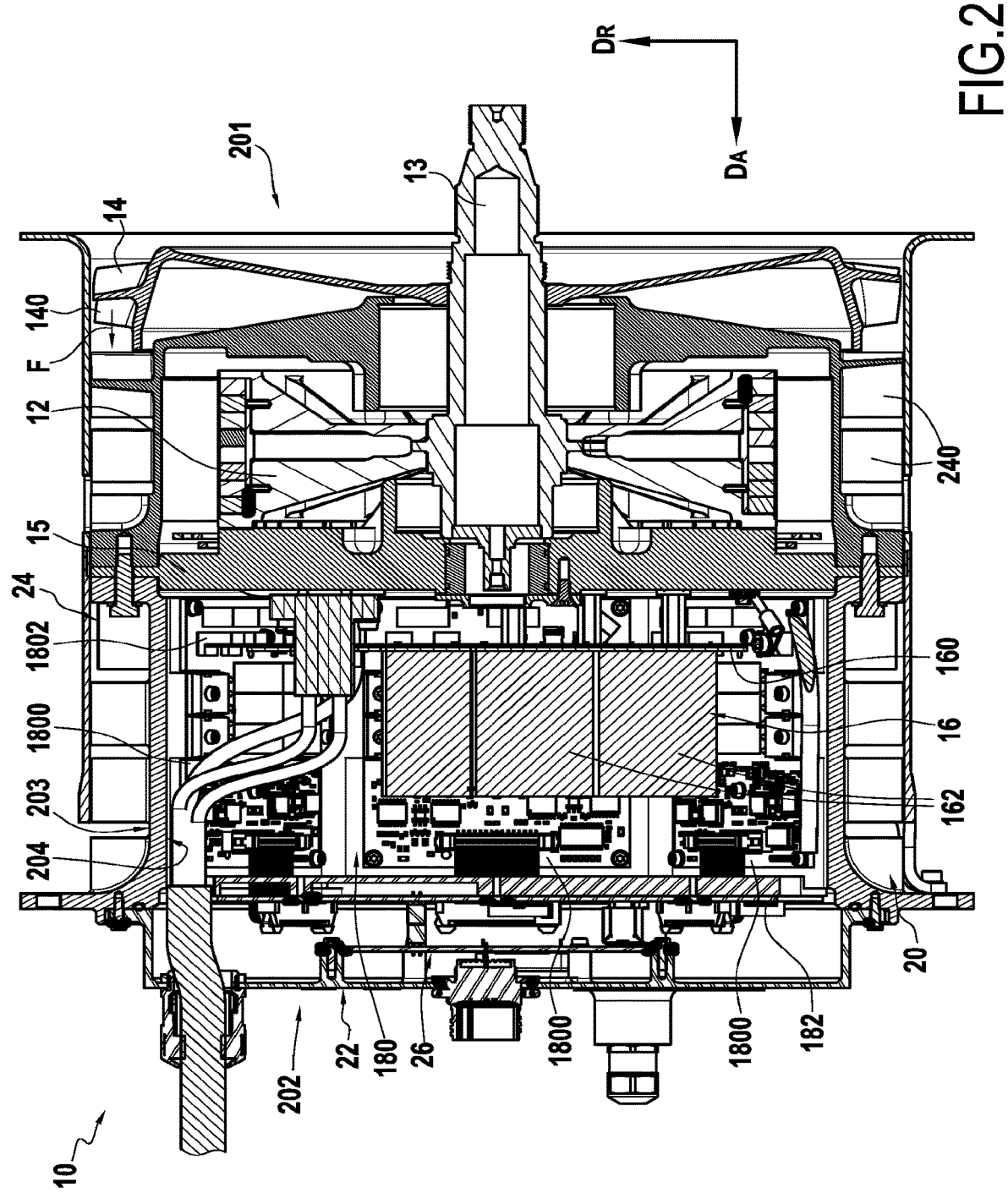
FIG. 2 shows schematically a section view of a smart motor of the propulsion system of FIG. 1 according to a first embodiment of the invention.

A section view of a smart motor 10 is shown schematically in FIG. 2, according to a first embodiment of the invention.

The smart motor 10 illustrated in FIG. 2 comprises an electrical machine 12 acting as an electromechanical converter and endowed with a rotating portion defining an axial direction $D_A$ and a radial direction $D_R$. FIG. 2 is a section view in a plane comprising the axial direction $D_A$ and the radial direction $D_R$.

The smart motor 10 further comprises an impeller 14, electrical filtering means 16, an electronic control unit 18, and a housing 20 or casing, inside which are accommodated the electrical machine 12, the electronic control unit 18 and the filtering means 16.

The impeller 14 is mechanically coupled to the electrical machine 12 by a transmission shaft 13, which allows the electrical machine to drive the impeller 14.

The housing 20 has a hollow cylindrical shape with, in the embodiment illustrated in FIG. 2, a circular cross section. The axis of revolution of the housing 20 is congruent with the axis of rotation $D_A$ of the electrical machine 12 which is congruent with the axis of rotation of the transmission shaft 13 and of the impeller 14.

The housing 20 comprises, in the axial direction $D_A$, a first end 201 and a second end 202 opposite to the first end 201.

In the axial direction $D_A$, the housing 20 is closed at its first end 201 by the impeller 14, and at its second end 202 by a cover 22.

The housing 20 comprises a cooling device 24 mounted on a radially external surface 203 of the housing 20. The terms "internal" and "external," and "interior" and "exterior" are used here with reference to the radial direction $D_R$ in the smart motor 10.

The cooling device 24 comprises a set of fins 240 extending radially outward from the radially external surface 203 of the housing 20, and thus forms a radiator allowing heat exchange between the fins 240 and a flow F of air crossing the fins 240 of the cooling device 24. The flow F of cooling air is generated and fed by the blades 140 of the impeller 14 driven by the electrical machine 12, and is thus self-maintained.

In the embodiment illustrated in FIG. 2, the cooling device 24 further comprises a cylindrical cooling casing 245 positioned around the cooling fins 240. The cooling casing 245 thus defines, with the radially external surface 203 of the housing 20, a cooling stream 248 in which the cooling air flow F is channeled.

In one variant, the smart motor could not comprise impellers and cooling casings in order to reduce the mass of the smart motor. The smart motor would then be cooled by the flow of air generated by the rotor of the aircraft, the rotor conventionally consisting of a propeller mechanically connected directly to the mechanical rotation shaft of the smart motor.

In the embodiment illustrated in FIG. 2, which shows a so-called "axial" configuration of the smart motor 10 according to the invention, the smart motor 10 comprises a housing 20 including a cooling device, a driving portion including the electrical machine 12, the impeller 14 and the transmission shaft 13, and an electronic portion separated in the axial direction from the driving portion, the electronic portion comprising in particular the electrical filtering means 16 and the control unit 18.

To physically separate the driving portion and the electronic portion, the smart motor 10 comprises an internal wall 15 extending in a radial plane comprising the radial direction $D_R$ and orthogonal to the axial direction $D_A$ and attached to a radially internal surface 204 of the housing 20. The electrical machine 12 is positioned inside the housing 20 upstream of the internal wall 15, while the electrical filtering means 16 and the electronic control unit 18 of the electronic portion are positioned downstream of the internal wall 15.

The terms "upstream" and "downstream" are used here with reference to the direction of flow of cooling air delivered, shown by the arrow F in FIG. 2.

The electronic control unit 18 comprises a static electrical converter 180 configured to power the electrical machine 12.

The electrical converter 180 is placed directly following the electrical machine 12 in the housing 20 of the smart motor 10, which allows reducing the length of the electrical connections between the electrical converter 180 and the electrical machine 12 passing through the internal wall 15 and thus dispense with interphase inductances.

The electrical converter 180 comprises, in the embodiment illustrated in FIG. 2, six power electronics boards 1800 arranged together to form a hollow cylinder with a hexagonal base coaxial with the electrical machine 12.

In a variant in which the electrical converter would comprise eight electronic boards, it would form a cylinder with an octagonal base. If it comprised five electronic boards, it would form a cylinder with a pentagonal base. In a variant in which the electrical converter would comprise a single electronic board, it could form a hollow cylinder with a circular base with a power electronics board having an annular shape, possibly with a first end and a second end facing one another in a direction orthogonal to the radial direction $D_R$ and to the axial direction $D_A$.

The electronic boards 1800 are positioned facing the internal surface 204 of the housing 20 to maximize cooling of the electronic power components.

The filtering means 16 comprise an electronic filtering board 160 on which are mounted capacitors 162.

In the embodiment illustrated in FIG. 2, the electronic filtering board 160 of the filtering means 16 has a hexagonal shape allowing its insertion into the hollow cylinder formed by the electronic boards 1800 of the electronic converter 180. The hexagonal shape of the electronic filtering board 160 cooperates with the hexagonal cross section of the hollow cylinder formed by the power electronic boards 1800 of the electrical converter 180, which allows adjusting the electronic filtering board 160 as close as possible to the electronic power boards 1800. The capacitors 162 and the electronic filtering board 160 are accommodated in the hollow cylinder of the electrical converter 180.

Each electronic board 1800 of the electrical converter 180 comprises at least one connection terminal 1802 extending in a radial plane comprising the radial direction $D_R$ and orthogonal to said axial direction $D_A$ allowing electrically connecting the electronic filtering board 160 to the power electronic boards 1800 of the electrical converter 180. Each connection terminal 1802 includes a corrugated portion which provides it with elasticity which allows offering a certain freedom of movement to the electronic filtering board 160 with respect to the electrical converter 180. The integration of the electrical filtering in the housing closest to the perturbing elements, such as the power switches of the electronic power boards 1800, allow reducing the cabling inductances and thus reducing the mass and the volume of the filtering.

In addition, the electronic control unit 18 comprises an electronic control board 182 configured to control the operation of the electrical machine 12. In the embodiment illustrated in FIG. 2, the electronic control board 182 comprises a hexagonal shape extending in a radial plane comprising the radial direction $D_R$ and orthogonal to the axial direction $D_A$ and parallel to the filtering board 160.

The smart motor 10 further comprises an electronic supervision board 26 accommodated inside the housing 20 and in communication with the electronic control board 182. The electronic supervision board extends in a radial plane comprising the radial direction $D_R$ and orthogonal to the axial direction $D_A$ and parallel to the filtering board 160. The electronic supervision board 26 is positioned facing the cover 22, between the cover 22 and the electronic control board 182.

In this axial configuration, the cooling device 24 is communalized between the electrical machine 12 and the electronic portion of the smart motor 10 comprising the filtering means 16 and the electronic control unit 18. The flow F of cooling air delivered by the blades 140 of the impeller 14 circulates along the radially external surface 203 of the housing 20 and fluidly communicates with the fins 240 of the cooling device 24. The radially external surface 203 of the housing 20 recovers both the heat generated by the electrical machine 12 and the heat generated by the electronic portion, particularly by the power converter 180, and transfers the calories to the flow F of cooling air, particularly via the fins 240, the air flow F then exhausting the calories outside the smart motor 10.

Figure 3:
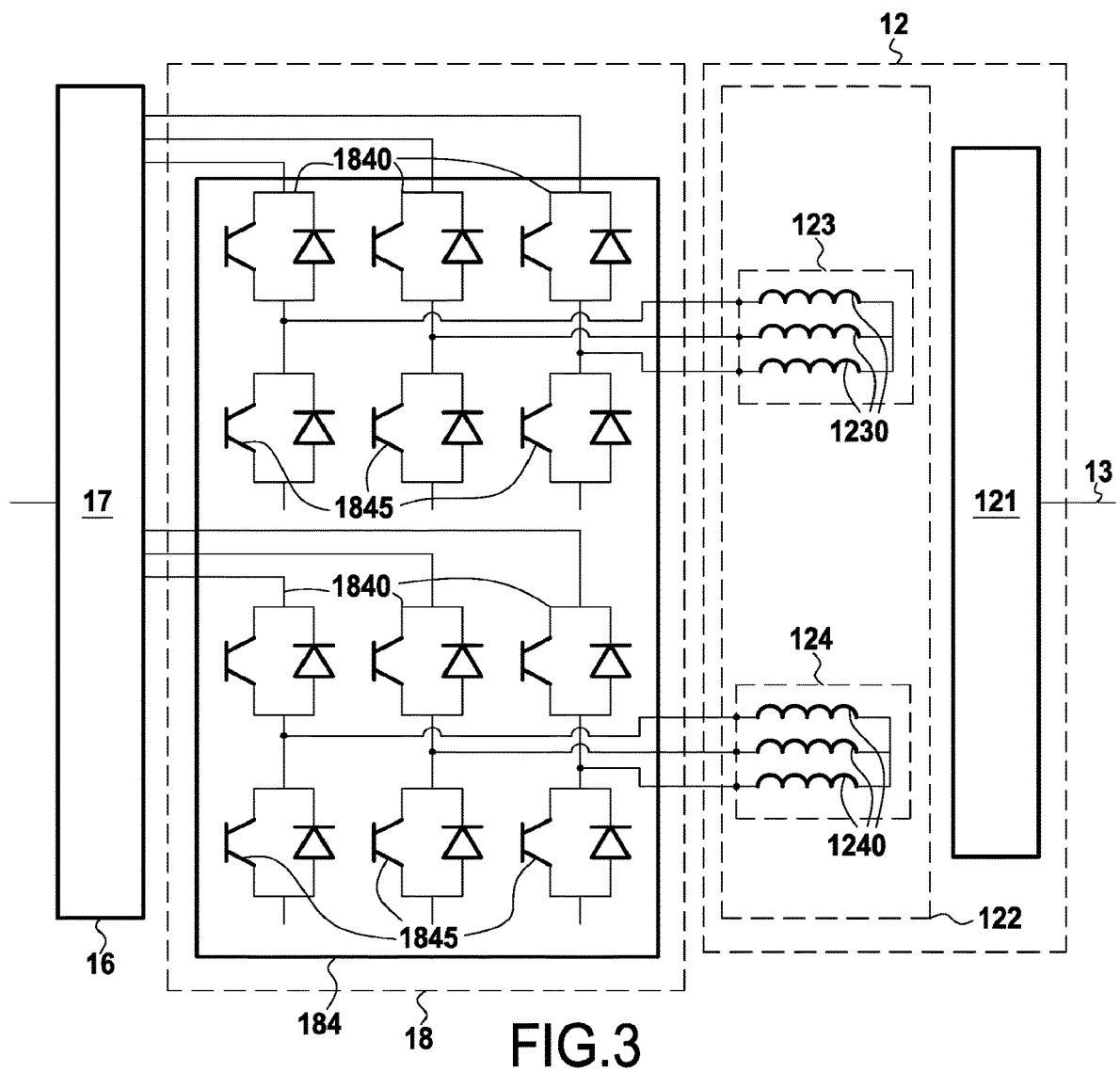
FIG. 3 shows schematically the electrical architecture according to a first embodiment of the electrical machine of the smart motor of FIG. 2.

As illustrated in FIG. 3, the electrical machine 12 of the smart motor 10 is a synchronous machine including a permanent magnet rotor 121 and a six-phase stator 122 endowed with a first three-phase assembly 123 of three first windings 1230 electrically coupled in a star and a second three-phase assembly 124 of three second windings 1240 electrically coupled in a star.

The electronic control unit 18 of the synchronous electrical machine 12 includes a control inverter 184 equipped with six independent arms 1840 each configured to control one phase of the six-phase stator of the electrical machine 12. The two three-phase assemblies 123 and 124 of star-connected windings are magnetically and electrically decoupled from one another.

To have a first and a second three-phase assemblies 123 and 124 of windings electrically and magnetically independent of one another, the windings 1230 of the first three-phase star-connected assembly 123 are wound, then the windings 1240 of the second three-phase star-connected assembly 124 are wound following the winding of the windings 1230 of the first three-phase assembly 123.

The stator 122 comprises a ring gear. Each of the first windings 1230 and of the second windings 1240 is wound around a single tooth of the ring gear, which allows minimizing the size of the stator 122, particularly the size of the head of each of the windings 1230 and 1240.

The rotor 121 includes magnets positioned in a Halbach array to increase the torque per unit mass of the smart motor 10.

The first windings 1230 of the first three-phase assembly 123 are positioned over a first angular range of the stator extending over 180 mechanical degrees, and the second windings 1240 of the second assembly 124 are positioned over a second angular range of the stator extending over 180 mechanical degrees. The first angular range is distinct from the second angular range, each angular range therefore covering a half-circle which allows maximizing magnetic decoupling and facilitating the electrical isolation between the two three-phase assemblies 123 and 124.

The electronic control unit 18 further includes a current regulation module in each three-phase assembly 123 and 124, independent of the other three-phase assembly 124 and 123, and a rotor speed regulation module 121.

The smart motor 10 also comprises a connection interface 17 connecting a DC high voltage power supply bus to each of the six arms 1840 of the inverter 184 of the electronic control unit 18. The connection interface 17 includes filtering means 16 produced in the form of a capacitive decoupling stage equipped with differential mode capacitors. In the embodiment illustrated in FIG. 2, the connection interface 17 is congruent with the electronic filtering board 160.

In the embodiment illustrated in FIG. 3, each power electronic board 1800 comprises power transistors 1845, electronic protection elements of the inverter 184, a phase current sensor and a DC high voltage bus voltage sensor.

The filtering system according to the invention corresponds to the filtering means 16 and comprises an electrical distribution device congruent with the electronic filtering board 160 described above and the capacitors 162 mounted on the electronic filtering board 160.

Figure 4:
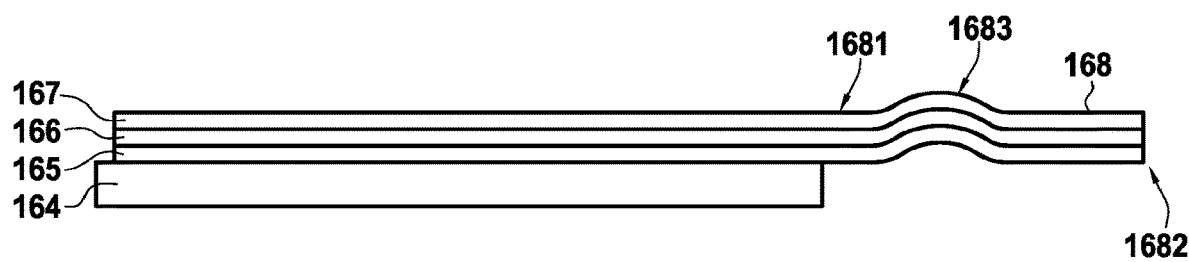
FIG. 4 shows schematically a section view of an electrical distribution device of a filtering system according to one embodiment of the invention.
Figure 5:
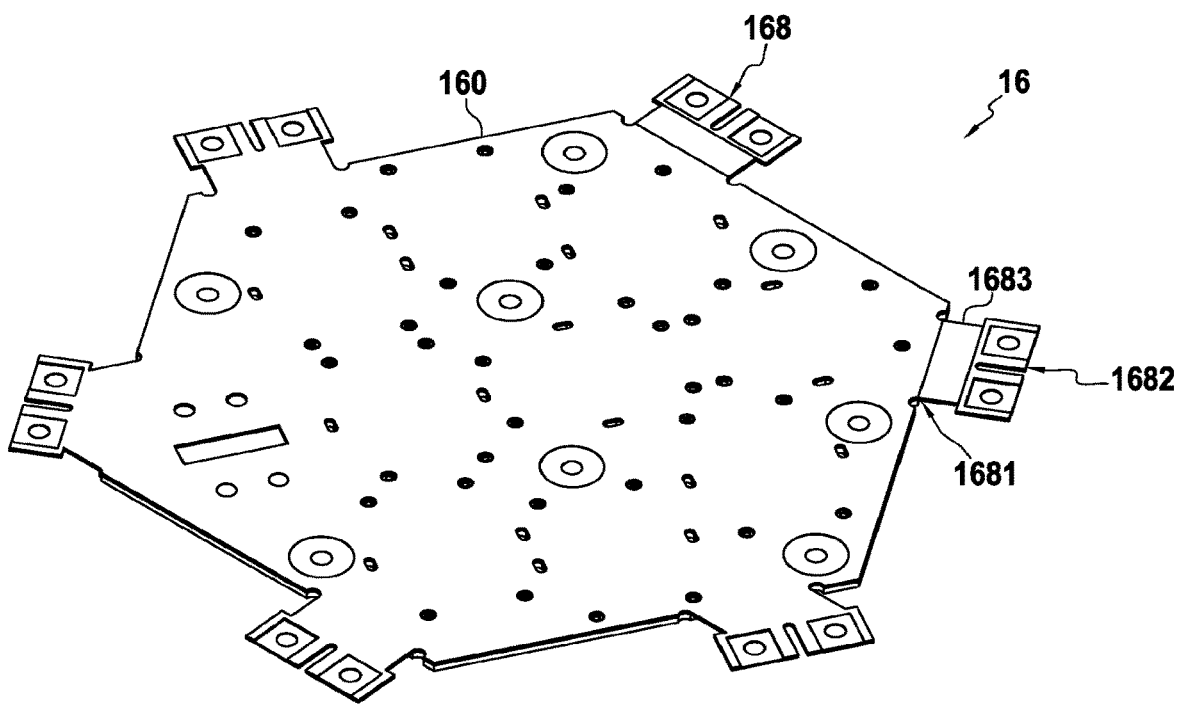
FIG. 5 shows schematically a perspective view of the electrical distribution device of FIG. 4.

In FIGS. 4 and 5 are illustrated respectively a second view and a perspective view of a hexagonal electronic filtering board 160 of the filtering means 16. For greater visibility, the capacitors 162 have not been shown in FIGS. 4 and 5.

As illustrated, the electronic filtering board 160 comprises an electrically insulating rigid support 164 extending in a plane and having a thickness in a direction orthogonal to the plane of the support 164. The electronic filtering board 160 further comprises, stacked successively on the support 164, a first electrically conducting layer 165, an electrically insulating layer 166, and a second electrically conducting layer 167.

The electronic filtering board 160 comprises connection terminals 168 extending beyond the outer perimeter of the rigid support 164 in a direction comprised in the plane of the support 164. Each connection terminal 168 comprises a first end 1681 integral with the electronic filtering board 160 which forms the electrical distribution device, and a second free end 1682 opposite to the first end 1681. Between the two ends 1681 and 1682, each connection terminal 168 comprises a flexible portion 1683.

The flexible portion 1683 forms a wave, or a wavelet, in a plane orthogonal to the plane in which the rigid support 164 extends, i.e. in the section plane of FIG. 4.

Figure 6:
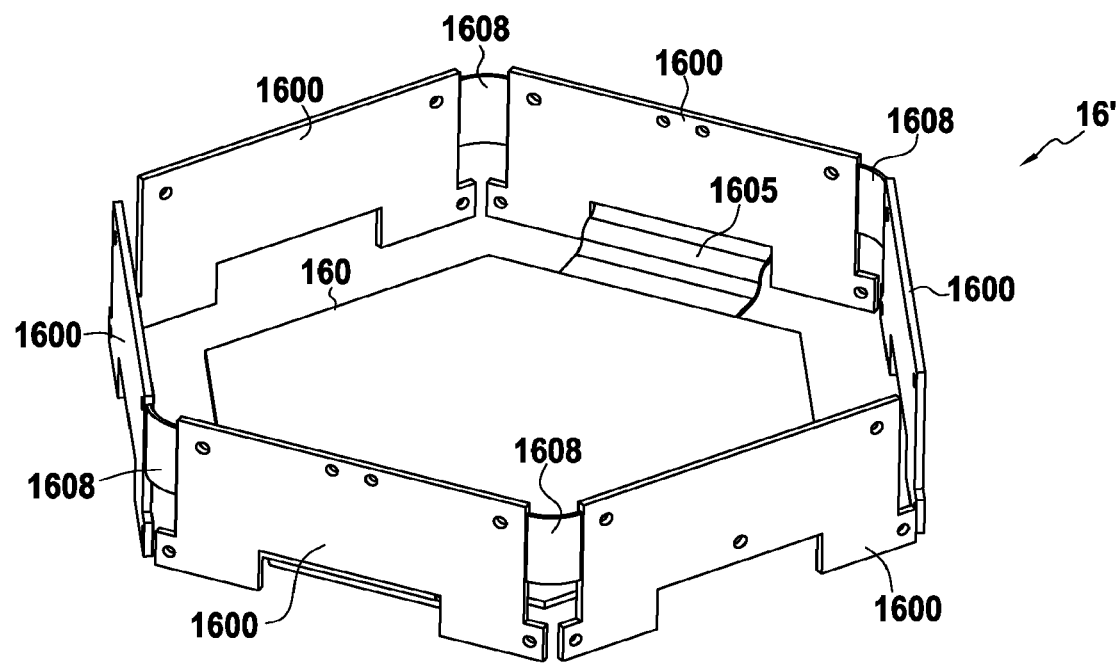
FIG. 6 shows a perspective view of an electrical distribution device of a filtering system according to a second embodiment of the invention.

A perspective view is shown in FIG. 6 of an electrical distribution device of a filtering system according to a second embodiment of the invention. For greater legibility, the capacitors 162 have not been shown in FIG. 6.

In this second embodiment, the filtering system 16' comprises not only a hexagonal electronic filtering board 160, but also six additional electronic filtering boards 1600 positioned orthogonally in the plane in which the hexagonal electronic board 160 extends. The set of additional electronic boards 1600 forms a hollow cylinder with a hexagonal base inside which is positioned the electronic filtering board 160.

In the embodiment illustrated in FIG. 6, in a first group of three successive additional electronic boards 1600, a first additional electronic board 1600 is coupled to the electronic filtering board 160 via a first flexible connection 1605, produced like the connection terminals 168, having a flexible portion in the form of a wave, and the two additional electronic boards 1600 adjacent to the first electronic board are connected to the first additional electronic board via flexible connections 1608, which allows coupling them to the electronic filtering board 160.

The group of the three other additional electronic boards 1600 also comprises a flexible connection 1605 between the electronic filtering board 160 and a first additional electronic board 1600 of the group and two flexible connections 1608 between the first additional electronic board of the group and the two additional electronic boards adjacent to it.

In this embodiment illustrated in FIG. 6, the filtering system 16' is accommodated inside the hollow cylinder formed by the electronic boards 1800 of the electrical converter 180 of the electronic control unit 18 of the smart motor 10. The filtering system 16' comprises flexible connection terminals connected between the electronic filtering board 160 and the electronic boards 1800 of the electrical converter 180 and/or between the additional electronic boards 1600 and the electronic boards 1800 of the electrical converter 180.

The invention provides a filtering system allowing minimizing the volume occupied by the filtering system and optimizing its installation in the housing of a smart motor while limiting the parasitic inductance between the power transistors and the filtering decoupling capacitors and by offering mechanical resistance to vibrations while avoiding isostatism.

The invention claimed is:

1. An electrical filtering system comprising capacitors and an electrical distribution device comprising a stack of two electrically conducting layers facing one another and separated by an electrically insulating layer, the stack being mounted on a rigid electrically insulating plate, and said capacitors being mounted on said electrical distribution device, the rigid plate extending in a plane orthogonal to the direction in which the conducting and insulating layers are stacked,
   wherein the electrical distribution device comprises a plurality of electrical connections distributed angularly over the outer perimeter of the electrical distribution device and protruding in a plane parallel to the plane in which the rigid plate extends, and extending from the outer perimeter of the electrical distribution device, each of the connections being, on the one hand, connected to at least one capacitor of the filtering system and, on the other hand, intended to be connected to an arm of an electrical inverter mounted on a tubular electrical converter of an electronic control unit, each of the electrical connections comprising a first end integral with the stack, a second free end opposite to the first end, and a flexible portion between the two ends.

2. The electrical filtering system according to claim 1, comprising a number of connections which is a multiple of three.

3. A smart motor comprising an electronic control unit comprising an electrical converter in the form of a hollow cylinder and an electrical filtering system according to claim 1 electrically connected to the electrical converter of the electronic control unit.

4. A propulsion system for an aircraft comprising at least one rotor and, for each rotor, at least one smart motor according to claim 3 mechanically connected to the rotor.

5. An aircraft comprising a propulsion system according to claim 4.

* * * * *